(12) United States Patent
Cheung

(10) Patent No.: US 6,775,124 B2
(45) Date of Patent: Aug. 10, 2004

(54) MICRO-GAP GAS FILLED DIELECTRIC CAPACITOR

(76) Inventor: William S H Cheung, Bellingdon, Wayside, Golders Green, London NW11 6OY (GB)

( * ) Notice: Subject to any disclaimer, the term of this patent is extended or adjusted under 35 U.S.C. 154(b) by 0 days.

(21) Appl. No.: 10/300,767

(22) Filed: Nov. 21, 2002

(65) Prior Publication Data

US 2003/0095371 A1 May 22, 2003

Related U.S. Application Data

(63) Continuation-in-part of application No. 09/987,395, filed on Nov. 14, 2001, now abandoned.

(51) Int. Cl.[7] .............................. H01G 4/02; H01G 4/30
(52) U.S. Cl. .................................... 361/326; 361/301.4
(58) Field of Search ................................ 361/326–327, 361/301.1–301.4, 277, 279

(56) References Cited

U.S. PATENT DOCUMENTS

| | | | |
|---|---|---|---|
| 1,905,264 A | | 4/1933 | Campbell et al. |
| 2,221,671 A | * | 11/1940 | Cooper .................... 174/17 GF |
| 3,377,852 A | * | 4/1968 | Leistra ........................ 73/160 |
| 3,727,117 A | | 4/1973 | Robinson |
| 5,162,972 A | * | 11/1992 | Gripshover et al. ........ 361/277 |
| 5,606,486 A | | 2/1997 | Moncrieff |

OTHER PUBLICATIONS

International Search Report dated Aug. 26, 2003, Int'l Appl. No. PCT/IB02/05144.
Small et al., "Stable Gas–Dielectric Capacitors of 5– and 10–pF Values", IEEE Transactions on Instrumentation and Measurement, vol. 38, No. 2, 1989, pps. 372–377.

* cited by examiner

Primary Examiner—Dean A. Reichard
Assistant Examiner—Eric Thomas
(74) Attorney, Agent, or Firm—Connolly, Bove, Lodge & Hutz LLP

(57) ABSTRACT

The gas dielectric capacitor for high frequency applications. The capacitor has first and second planner electrodes separated by an adhesive having solid particles, which establish the distance between electrodes. An adhesive is formed along peripheral edges of the planner electrodes. The capacitor may include air, vacuum, or any number of other dielectric gases, which may be under pressure. A method is disclosed for manufacturing an array of capacitors having a pressurized gas dielectric.

12 Claims, 8 Drawing Sheets

MICRO-GAP GAS FILLED DIELECTRIC CAPACITOR

RELATED APPLICATIONS

This application is a continuation-in-part of Ser. No. 09/987,395, filed Nov. 14, 2001, now abandoned.

FIELD OF THE INVENTION

The present invention relates to components used in high frequency/microwave circuit applications. Specifically, a single layer gas filled or vacuum capacitor is described for use in millimeter wave applications having a stable capacitance with low radio, frequency signal losses.

BACKGROUND

Radio communication services are becoming so numerous they are reaching the 50 GHz millimeter wave spectrum. As the demand for more telecommunications services increases, and the spectrum becomes increasingly crowded, it is foreseeable that applications in the 50–100 GHz millimeter wave spectrums will be utilized for various telecommunications applications.

Circuits for generating and processing signals in the millimeter wave spectrum present significant challenges to component designers. As the frequencies increase, the quality of the components becomes increasingly difficult to maintain. Specifically, for a basic capacitor utilized in circuits operating at these frequencies, the internal equivalent series resistance (ESR) increases significantly using known dielectrics and construction techniques for microwave capacitors. Upper frequency spectrum in UHF to SHF are limited because dielectric materials used in the capacitors exhibit a significant change in ESR with frequency. As the frequency increases for a typical high frequency capacitor, the ESR can increase from 0.05 ohm at 200 MHz, to 0.11 ohm at 900 MHz, and to 0.14 ohm at 2,000 MHz and significantly higher ESR at losses can be expected. Additionally, the dielectric constant $\epsilon$ also changes as frequencies increase. Thus, capacitors in particular have a practical upper frequency spectrum at UHF to SHF limitation when they are constructed with conventional dielectric materials.

One of the more advantageous dielectrics is air. Early capacitor designs used in low frequency applications employed air capacitors particularly for high-powered applications. These capacitors were physically large because higher capacitance (20 to 800 pF) are required to work at lower RF frequency (100 KHz to 30 MHz). In order to stand higher working voltage, it was necessary to increase the distance between electrodes. Consequently, the use of air or a vacuum as a dielectric has not seen widespread use outside of this limited application.

Capacitors which utilize a gas, or a vacuum, as a dielectric approach a theoretical performance of an ideal capacitor having no losses and a dielectric constant which remains constant over an extremely wide frequency spectrum up to SHF. The power factor for the earlier low frequency gas-vacuum dielectric capacitors is low, making them suitable for carrying high current levels. In the event of an internal breakdown due to an excessive voltage producing a flash over between capacitor electrodes, the dielectric is self-healing, i.e., it is not destroyed or altered as a result of the arc generated between the electrode plates. Further, as it is known with many dielectric materials used in conventional capacitor applications, a gas or a vacuum dielectric will not suffer from aging and degradation in performance over time.

An additional difficulty in using capacitors of a conventional design at millimeter wave frequencies is that most of these capacitors have a lead wire length, or end cap attachment, which would introduce significant circuit inductance as well as series circuit resistance with the capacitor. In typical microwave applications, the capacitor electrode is directly bonded or soldered to a PCB circuit pattern trace on a circuit board. These connection techniques also introduce the disadvantageous series inductance and resistance.

Accordingly, the present invention is directed to an implementation of a gas filled or a vacuum dielectric capacitor which can be used at extremely high frequencies, up-to and including the millimeter wave spectrum.

SUMMARY OF INVENTION

A capacitor is provided for high frequency applications. The capacitor utilizes either a vacuum or gas dielectric to provide an improved performance. First and second planer electrodes are separated by micro particles having a diameter in the 3–20 micron range. The micro particles are included in an adhesive spread along the peripheral edges of the planer electrodes. The adhesive bonds the separated electrodes together producing a gas or vacuum dielectric between the electrodes.

In accordance with the preferred embodiment of the present invention, the dielectric may be a vacuum, air, or any number of inert gases which exhibit a dielectric constant approaching 1. The surfaces of the electrodes may be abraded to increase the apparent surface area, and therefore, the nominal capacity of the capacitor.

A method for manufacturing the capacitor permits the dielectric to be either a vacuum or a pressurized gas such as air, nitrogen and gases having superior dielectric properties. In carrying out the method in accordance with the present invention, a sealant mixture containing solid particles is disposed along the periphery of one of the electrodes forming capacitor. After removing air and moisture from the electrodes, the electrodes are pressurized with a dielectric gas. The electrodes are then brought together in a pressure contact with each other so that the sealant joins the electrodes which are spaced apart by the particle spacers within the sealant. Once the sealant has hardened, the capacitor may be removed from the pressurized environment, and the pressure is maintained between the electrodes of the capacitor.

DETAILED DESCRIPTION OF A PREFERRED EMBODIMENT

The fundamental formula for a capacitor having 2 planer parallel plates separated by a dielectric material is summarized as:

$$C=0.0885\epsilon A/d;$$

Where C is the capacitance in picofarads (pF);

$\epsilon$ is the dielectric constant;

A is the area common to both plates; and d is the distance between the plates in centimeters.

In practice, the dielectric constant $\epsilon$ is determined by the material between the electrodes of the capacitor. Many common dielectric materials used in capacitors designed for lower frequency operations exhibit a significant change in dielectric constant $\epsilon$ as well as higher losses as the frequency increases. At low frequencies, having a dielectric with a high dielectric constant produces a greater capacity for the size of the component. At higher frequencies, the internal equivalent series resistance (ESR) and lead inductance losses increase as frequencies increases degrading the component quality.

Air has a dielectric constant of 1 which is substantially frequency invariant. Thus, as the frequency of the signal through the capacitor increases, the capacitor exhibits substantially the same capacitance without any significant increases in ESR losses. Lowering the dielectric constant $\epsilon$ to 1, however, reduces the capacity obtainable for a capacitor of a given size. At high millimeter wavelengths, however, capacities of the range of 0.5–100 pF can be achieved using a gas dielectric or a vacuum dielectric.

Typical capacitors for use in the millimeter wave frequency range may have an electrode surface area and spacing as shown in Table 1.

TABLE 1

| | | Spacer Size | | | | |
|---|---|---|---|---|---|---|
| | | 3 | 5 | 6 | 8 | 10 (micron) |
| Electrode | 5 × 5 mm | 73.73 | 44.25 | 56.88 | 27.66 | 22.13 (pF) |
| Size | 4 × 4 | 47.20 | 28.30 | 23.60 | 17.70 | 14.16 |
| | 3 × 3 | 26.55 | 15.93 | 13.28 | 9.96 | 7.98 |
| | 2 × 2 | 11.8 | 7.08 | 5.90 | 4.43 | 3.54 |
| | 1 × 1 | 2.95 | 1.77 | 1.48 | 1.11 | 0.89 |

The top line shows spacing between electrode plates of 3, 5, 6, 8 and 10 microns. For the given spacing and the air dielectric, the capacitor plate size is shown. For instance, square capacitor structures between 1×1 mm and 5×5 mm are shown and values of capacitance from 0.89 pF –73.73 pF may be obtained.

Figure 1:
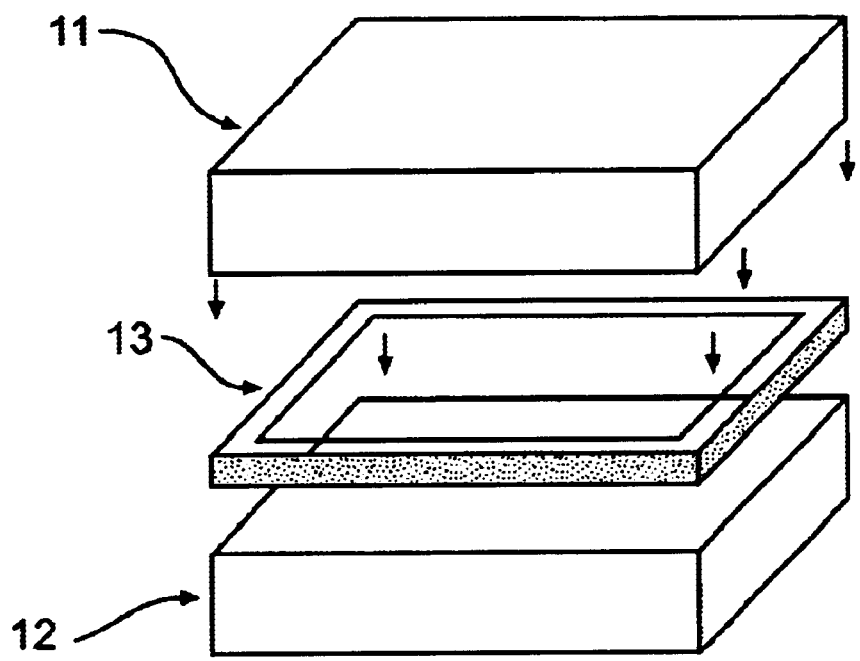
FIG. 1 is an exploded view of a capacitor in accordance with the preferred embodiment of the present invention.

Referring now to FIG. 1, an exploded view shows a gas or vacuum capacitor in accordance with the forgoing table. Electrode plates 11, 12 are made from standard sheet material having a high conductivity. The surfaces of the electrodes which face each other may be roughened to increase the relative surface area for the capacitor.

Electrode plates 11 and 12 are separated by a mixture of a sealant, such as an epoxy resin, and silica spacer material, which may be microspheres having a diameter equal to the required spacing of table 1 between electrode plates 11 and 12.

The spacer material may be spherically shaped, highly stabled silica micro-particles, such as is found in the manufacture of liquid crystal displays. The mixture of spacer materials and epoxy is applied along the edges of one of the capacitor electrodes 12. The applied sealant and silica spacers 13 are placed in compression by moving the electrodes 11 and 12 together to form an air or vacuum type seal between electrodes 11 and 12. The completed capacitor as shown in FIG. 2 may then be plated along the exterior surface of electrodes 11 and 12 to provide for electrical contact with circuit traces on a circuit board.

Figure 2:
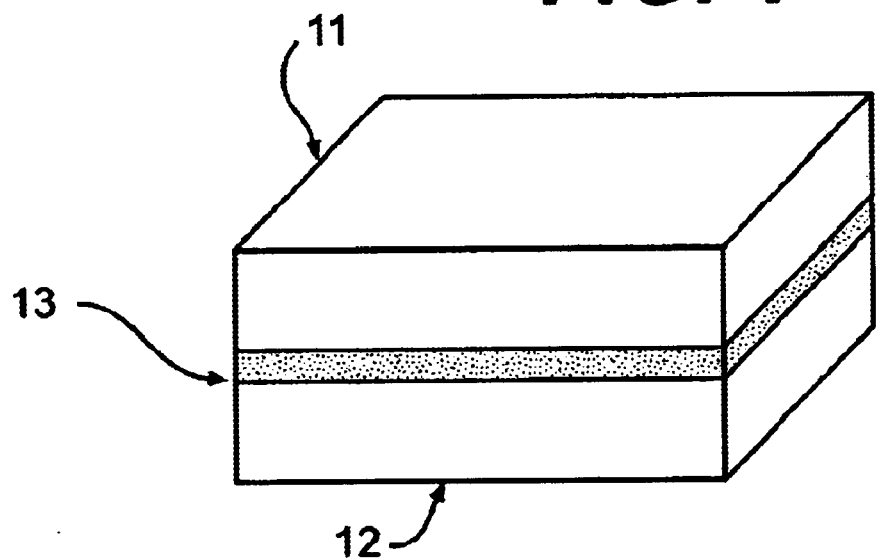
FIG. 2 is an isometric view of a complete capacitor in accordance with the preferred embodiment of the present invention.
Figure 3:
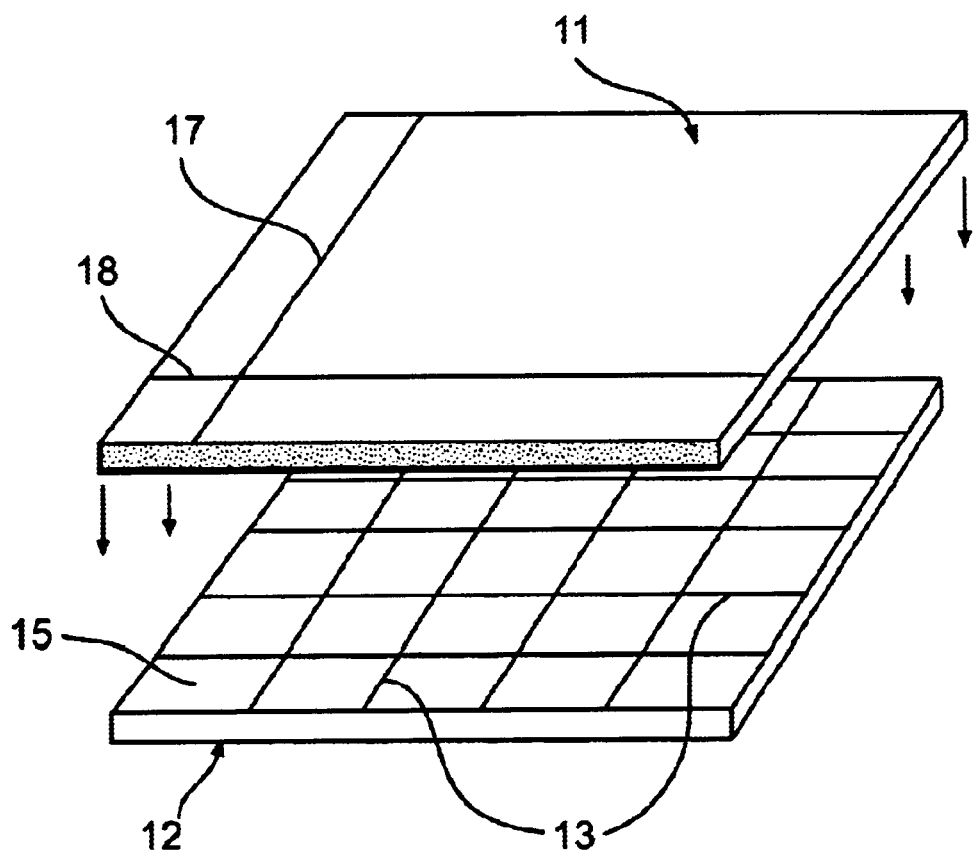
FIG. 3 is an exploded view of an array of capacitors formed in accordance with the preferred embodiment of the present invention.

The construction of an individual capacitor as shown in FIGS. 1 and 2 may be accomplished as an array of capacitors which are cut into individual capacitors. FIG. 3 illustrate such an array which is fabricated from planner electrode materials 11 and 12. On one of the electrodes 12, the mixture of epoxy and spacer material is silk screened to form the capacitor cells 15. Once the sealant has been applied via silk screening, or another analogous method, the top and bottom electrode plate materials are brought into contact with each other under pressure, separated by the mixture of epoxy and spacer material 13. Once the sealant has hardened, the array is cut along the guidelines 17 and 18 (only two of which are shown) to produce individual capacitors.

The foregoing description of the manufacture of capacitors according to the preferred embodiment of the present invention contemplates the creation of an air dielectric between electrodes 11 and 12. It is also possible to provide for a vacuum dielectric, or a pressurized air or other gas dielectric. Specifically, it is contemplated that nitrogen under pressure may be used as a dielectric, as well as, SF6 (Hexafluoride) and $CCL_2F_2$ (FREEON 12), which has more dielectric strength than air increasing the working voltage for the capacitor. By increasing the gas pressure between the electrodes, the working voltage for the capacitor may also be increased.

Figure 4:
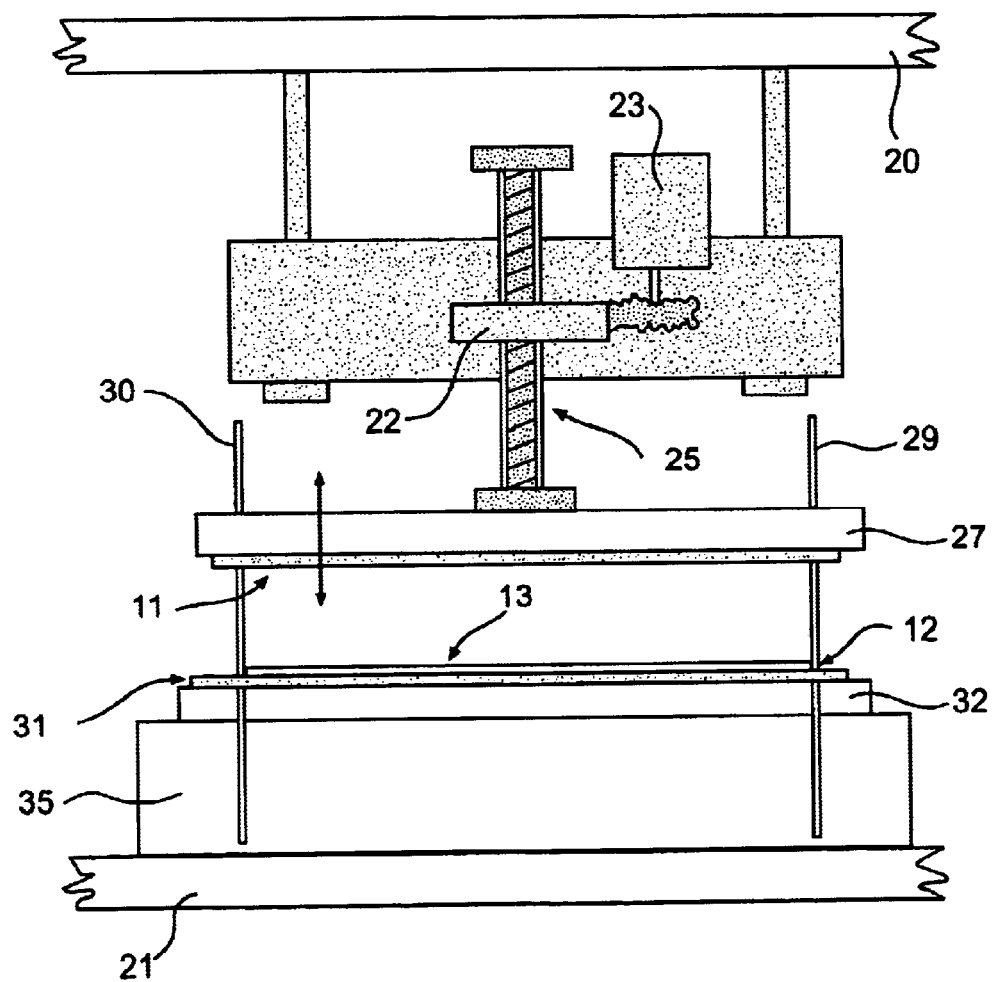
FIG. 4 illustrates an apparatus for manufacturing the capacitor in a controlled atmosphere.

Referring now to FIG. 4, there is shown an apparatus which permits the manufacture of gas or vacuum dielectric capacitors. A chamber having a top 20 and a bottom 21 is illustrated in which a vacuum may be drawn, or in which a higher-pressure atmosphere may be created as a dielectric for the capacitors. The electrode plates 11 and 12 are fixed to a top holding table 27 and a bottom holding block 35 respectively. The top and bottom holding blocks are positioned with respect to each other by guide rods 29 and 30. The top holding table 27 includes a vacuum port (not shown) for maintaining the top electrode plate 11 fixed thereto. The bottom electrode plate 12 resides on a rubber sheet material 31 which is capable of compressing under pressure. A pressure sensor block 32 monitors the amount of pressure exerted against the bottom plate 12.

The top electrode holding table 27 is supported to a linear actuator 22. Linear actuator 22 has a motor drive 23, and associated gear box which moves the operating member 25 vertically. The top electrode holding table 27 moves under control of the motor 23 to place the top electrode plate 11 in contact with the lower electrode plate 12, via the mixture of the epoxy and spacer 13.

In order to provide a vacuum dielectric for the capacitor, the vacuum chamber 19 is evacuated to remove moisture and air from within the chamber 19. Once the vacuum is obtained, the top electrode 11 may be brought into pressure contact with the lower electrode 12. An auxilliary heater (not shown) may be utilized to improve the curing time for the epoxy. Once the epoxy sealant has cured, the vacuum may be removed and the capacitor electrode may be subsequently plated.

Figure 5:
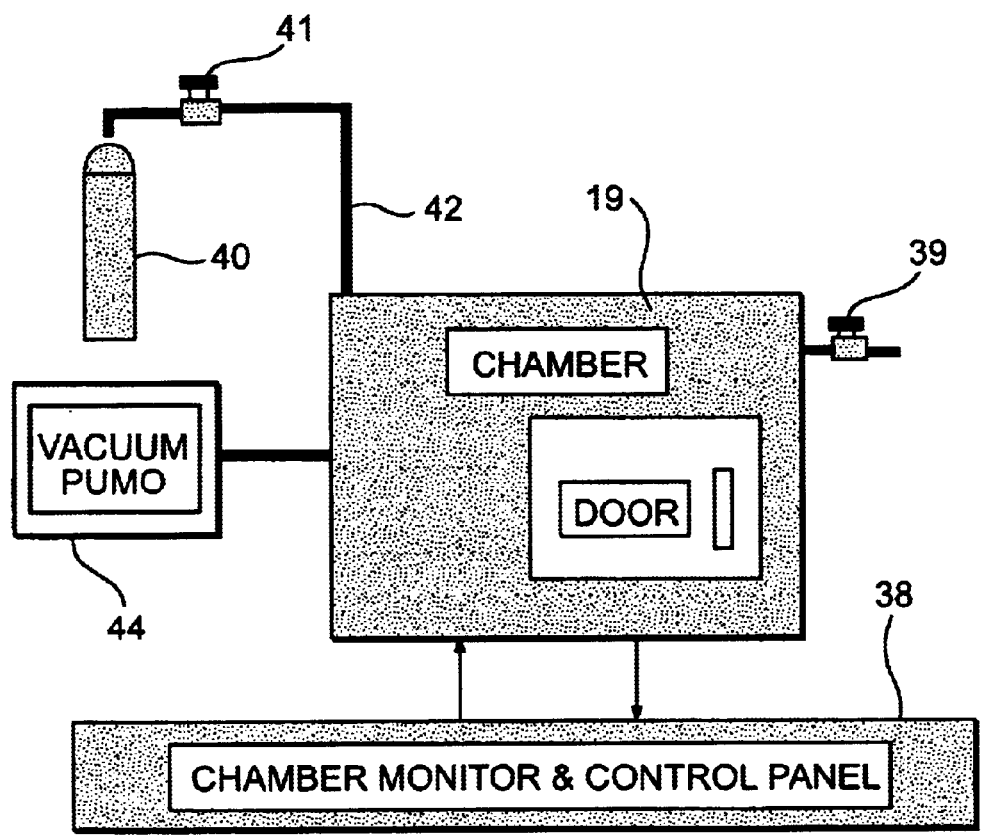
FIG. 5 illustrates the process for forming a pressurized dielectric within the capacitor.

The device of FIG. 4 may also be used to provide a pressurized dielectric between electrode plates 11 and 12. FIG. 5 illustrates the same device being pressurized with nitrogen from a nitrogen bottle 40 through valve 41 and conduit 42. In this embodiment of the present invention, the chamber is first vacuum pumped with a vacuum pump 44 to remove air and moisture within the chamber. Following vacuum pumping of the chamber 19, nitrogen may be introduced into the chamber, via nitrogen cylinder 40, valve 41 and inlet conduit 42. The chamber is pressurized to a pressure level monitored by control panel 38. Once the appropriate pressure is reached, the upper and lower electrode plates 11, 12 are brought together under control of the apparatus of FIG. 4 internal to the vacuum chamber 19. Once the electrodes have been sealed with respect to each other, the nitrogen inlet valve 41 is closed and the air outlet control valve 39 opened, restoring an ambient pressure within chamber 19. At this point, the door of the chamber 18 can be opened and the capacitor removed. The capacitor includes a pressurized interior containing nitrogen or an equivalent gas as a dielectric. The foregoing operation can also be utilized to create a vacuum within the capacitor as a dielectric.

Figure 6:
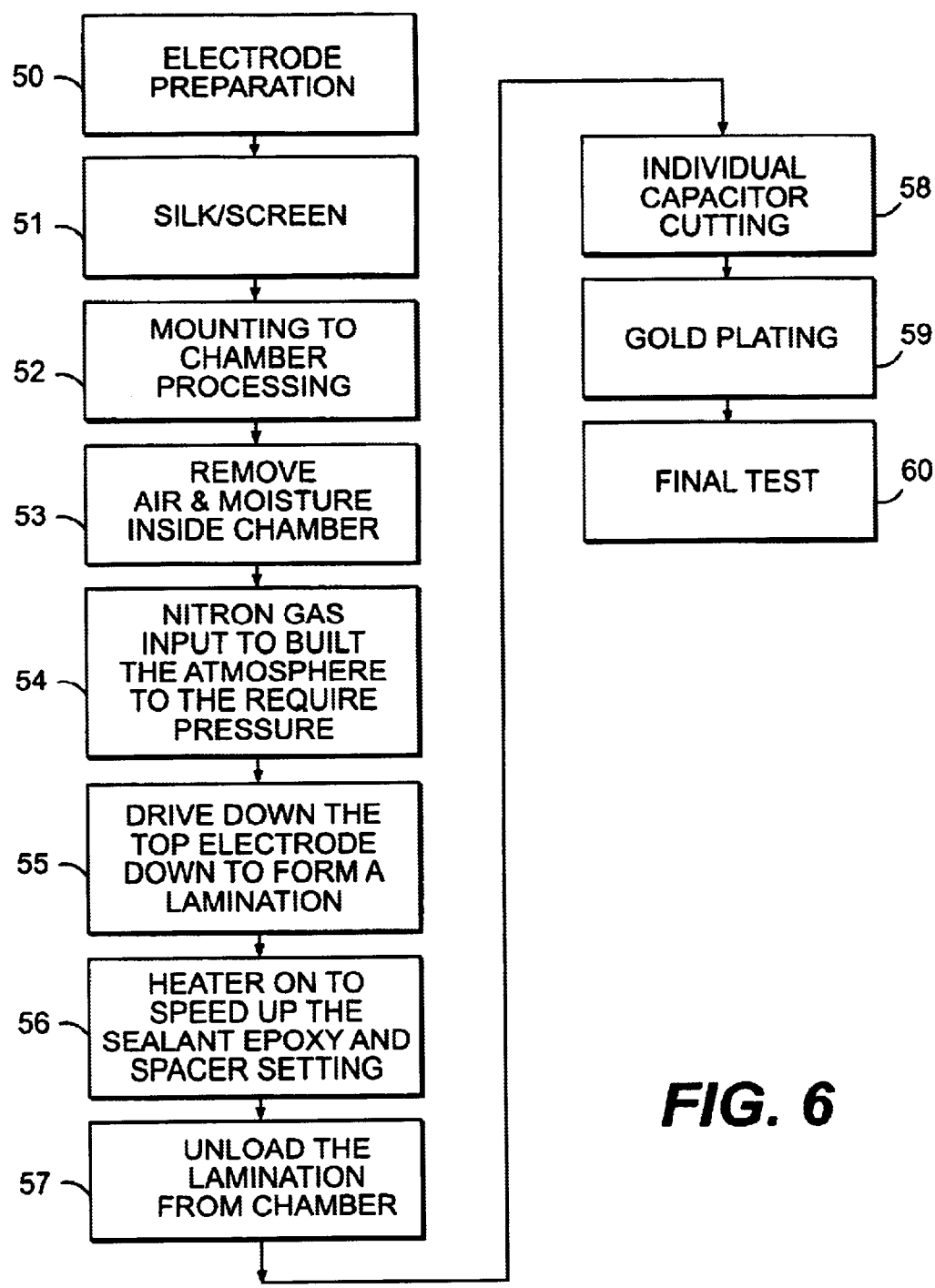
FIG. 6 illustrates the process steps in accordance with the preferred embodiment for manufacturing capacitors.

The process of producing capacitors in accordance with the preferred embodiment of the present invention is more particularly described with respect to FIG. 6. A flow chart illustrates the process steps which are used to manufacture an array of capacitors which can be later cut into individual capacitor components.

Electrodes are prepared in step 50 by cutting sheet stock of conductive material, such as, copper in a size in which an array of capacitors can be formed. One of the electrode sheets is silk screened in step 51 along the peripheral edges of the individual capacitors of the array with a sealant such as an epoxy and spacer materials for setting the distance between electrode plates of the capacitor. The upper and lower electrode plates are then mounted in the chamber in step 52, and the air and moisture inside the chamber is removed in step 53. Nitrogen gas is then forced into the chamber in step 54 under pressure to establish the appropriate pressure level within the chamber. The top electrode is then forced in step 55 into contact with the sealant and spacer material formed around what will be the edges of the plurality of capacitors. A heater within the chamber may be enabled in step 56 to facilitate curing of the sealant.

Once the sealant has hardened, the array of capacitors are removed from the chamber in 57, and the array is cut along individual score lines formed on one of the electrodes in 58 to produce individual capacitors. The individual capacitors may be gold plated in 59, 1 to facilitate their connection with circuit traces on a circuit board. Each individual capacitor may be tested in step 60 to determine that the process has riot produced any defective components.

The air or gas dielectric provides for the foregoing improvement and performance over frequency having very low losses. The air dielectric is degraded somewhat by the epoxy and spacer material 13 when the size of the capacitor is reduced. As long as the total area occupied by the epoxy and spacer material 13 is less than 2% of the total capacitor cavity area, the effects of the epoxy and spacer material are deminimus on capacitor performance.

As an alternative for reducing even further the effects on capacity by the adhesive and spacer material 13, it is possible to apply spacer and adhesive (epoxy) material 13 on the corners of the facing plates, thereby reducing the total area occupied by the epoxy and spacer material 13. However, the large gaps between the epoxy and spacer material 13 are later filled with a sealant to keep moisture and other containments from entering the dielectric space for the capacitor.

Figure 7:
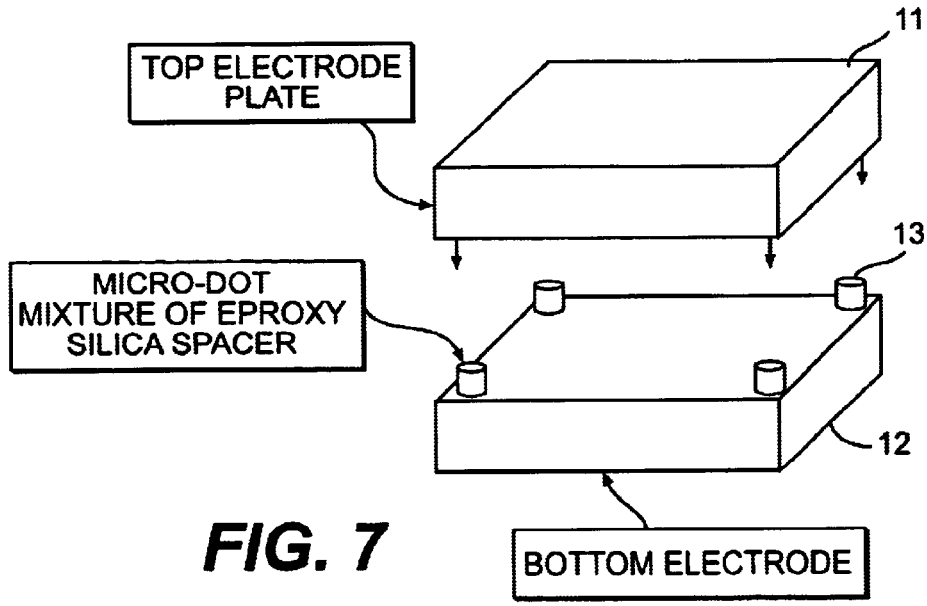
FIG. 7 illustrates an exploded view of another embodiment of a capacitor in accordance with the invention.
Figure 8:
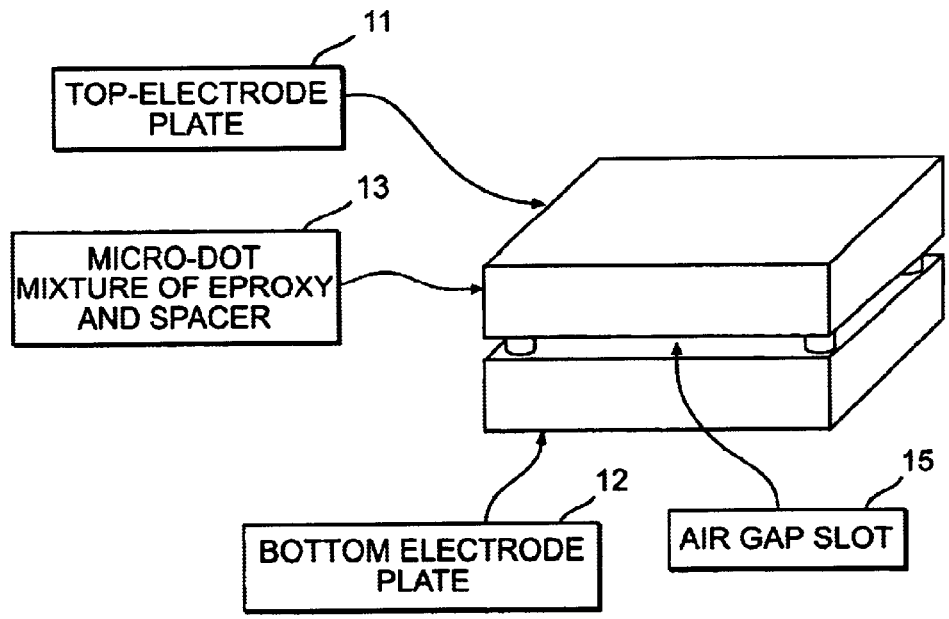
FIG. 8 shows the top and bottom electrode plates connected together by dot mixtures of epoxy and spacer materials.

An exploded view of the foregoing embodiment is shown in FIG. 7. The top and bottom electrodes 11 and 12 are designated the same as in the previous embodiment, and no change is contemplated from the previous embodiment. The spacer material and epoxy are maintained on the corners of the rectangular electrodes 11 and 12, and as shown in FIG. 8 form a bond between the two electrodes 11 and 12 creating a dielectric air space there between. The air gap 15 is later filled, seal the interior of the capacitor.

Figure 9:
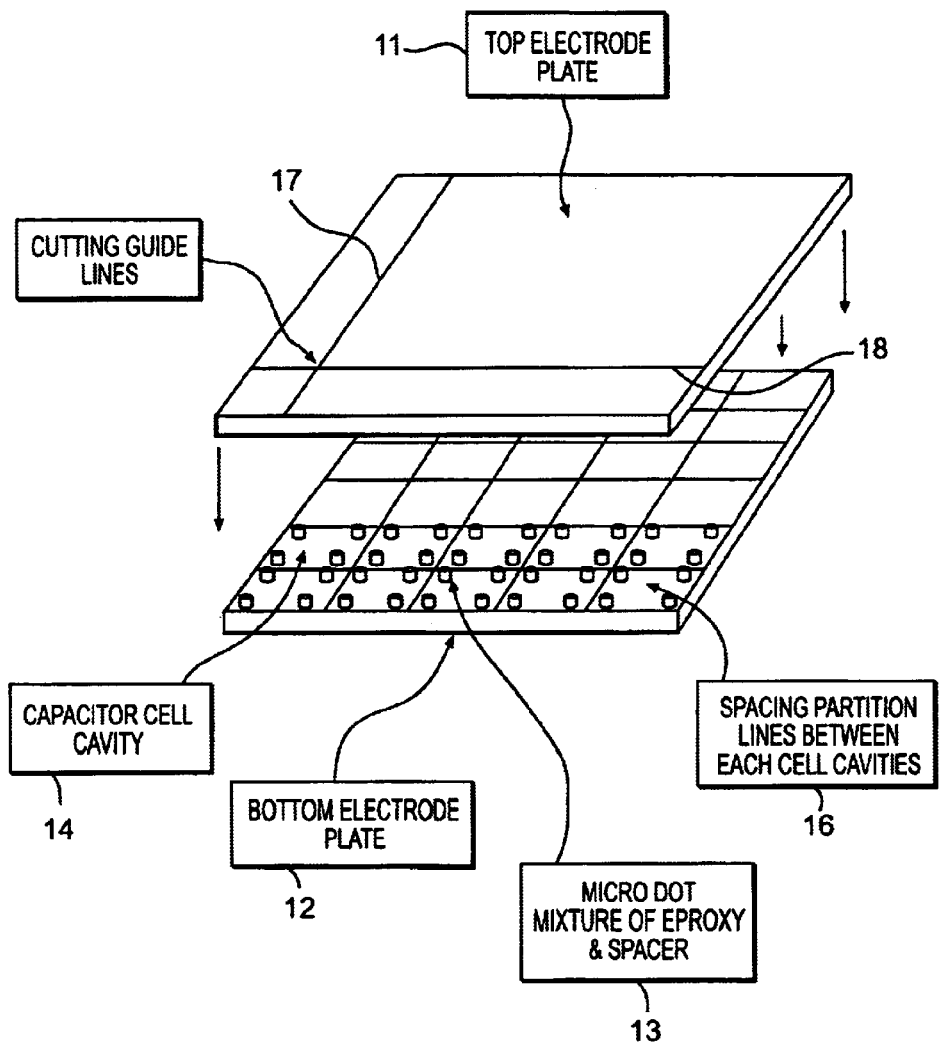
FIG. 9 illustrates an exploded view of the process for making an array of capacitors in accordance with the second embodiment of the invention.

FIG. 9 shows an array of such capacitors being formed by electrode plate material 11 and 12, which face a plurality of micro-dots of epoxy and spacer material 13. A spacing constituting partition lines between capacitors 16 is shown, separating each of the capacitor cell cavities 14. As in the previous embodiment, cutting lines (two of which are shown 17 and 18) on the top electrode plate 11 permit the individual capacitors to be cut from the array.

Figure 10:
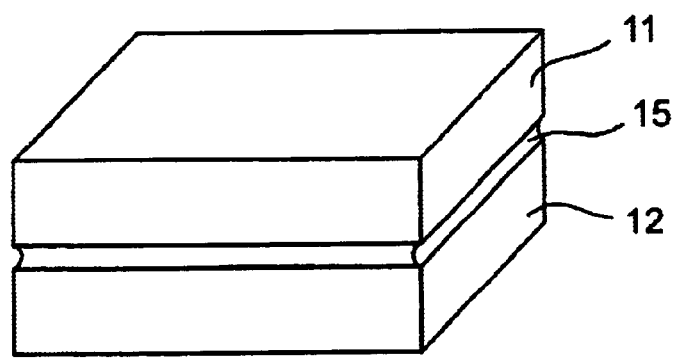
FIG. 10 illustrates the completed capacitor with sealed air gap slots.
Figure 11:
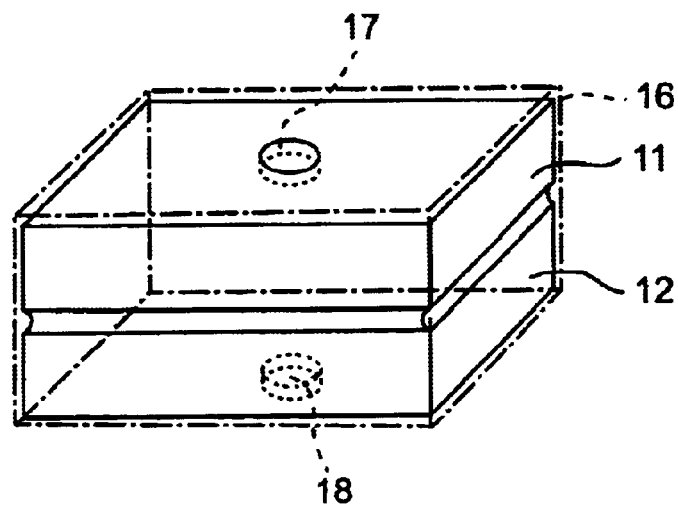
FIG. 11 illustrates a further sealing of the individual capacitors against moisture and other contaminants.

The individual capacitors produced cutting the array of FIG. 9, are shown in FIG. 10 with the air gap 15 sealed by an externally applied epoxy sealant 15. In order to provide mechanical strength to the capacitor, it is possible to seal the capacitor by potting the individual capacitors, with a potting compound 16 as shown in FIG. 11. The potting compound 16 includes opening 17 and 18 to permit electrical connection to each of the electrodes 11 and 12.

The foregoing alternative embodiment permits the reduction in size of capacitors, to as small as 2×2 mm, having a cavity area of 4$e$-6. Each of the micro-dots of epoxy and spacers 13 has a approximate area of 3.14 16$e$-2 mm, and represents less than 1% of the total capacitor dielectric area. The spacing between capacitor plates can be as low as 0.1 mm, equal to the diameter of the spacer adhesive material 13 shown in each of the corners of FIG. 7. These micro-dots of epoxy and spacer material 13 may be applied by silk screen, as in the previous embodiment, on the corners of the individual capacitor cells as shown in FIG. 7.

The foregoing description of the invention illustrates and describes the present invention. Additionally, the disclosure shows and describes only the preferred embodiments of the invention but, as mentioned above, it is to be understood that the invention is capable of using various other combinations, modifications, and environments and is capable of changes and/or modifications within the scope of the inventive concept as expressed herein, commensurate with the above teachings and/or the skill, or knowledge of the relevant art. The embodiments described hereinabove, are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What we claim is:

1. A gas dielectric capacitor for high frequency applications having a capacity in the range of 0.5 pf–100 pf comprising:

first and second planar electrodes separated by an adhesive applied along peripheral edges of said planar electrodes, said adhesive including solid particles for establishing a spacing between said first and second planar electrodes.

2. The gas dielectric capacitor according to claim 1 wherein said gas is air.

3. The gas dielectric capacitor according to claim 1 wherein said solid particles are substantially apherical Silica microparticles.

4. The gas dielectric capacitor according to claim 3 wherein said adhesive is an epoxy resin.

5. The gas dielectric capacitor according to claim 1 wherein the surfaces of said electrodes facing each other are abraded to increase the apparent surface area and capacity of the capacitor.

6. The gas dielectric capacitor according to claim 1 wherein said dielectric is one of the gasses comprising the group of nitrogen, hexafluoride, freon, and helium.

7. The gas dielectric capacitor of claim 1, wherein said adhesive and solid particles occupy substantially the entire perimeter of said first and second electrodes.

8. The gas dielectric capacitor of claim 1, wherein said adhesive and solid particles occupy an area of less than 2% of the area of said first and second electrodes.

9. The gas dielectric capacitor according to claim 1, wherein said first and second electrode are rectangular and said adhesive and solid particles are substantially confined to corners of said first and second electrodes have a commonly facing area of less than 25 mm sq.

10. A gas dielectric capacitor comprising:
a first planer electrode;
a second planer electrode facing said first planar electrode, and spaced apart there from by a plurality of spacers forming a space to contain a gas dielectric; and
an adhesive mixed with said spacers for maintaining said first and second planar electrodes and said spacers in fixed alignment.

11. The gas dielectric capacitor according to claim 10, further comprising a sealant material along edges formed by said first and second planar electrodes for maintaining said space free from external contaminants.

12. The gas dielectric capacitor according to claim 10, further comprising a potting compound enclosing said first and second planar electrodes having an opening for connecting said electrodes to an external circuit.

* * * * *